Patented Oct. 14, 1947

2,429,099

UNITED STATES PATENT OFFICE 2,429,099

BENZOQUINONE MONO-OXIME SEMICARBAZONE AS A FUNGICIDE

Elbert C. Ladd, Passaic, N. J., assignor to United States Rubber Company, New York, N. Y., a corporation of New Jersey No Drawing. Application February 9, 1945, Serial No. 577,133

10 Claims. (Cl. 167—30)

This invention relates to new and useful improvements in fungicides. The invention further relates to methods of treating plants, and to methods of protecting organic material subject to attack by fungi, as the immunizing of seed, and the mildewproofing of fabrics and other material.

I have found that benzoquinone mono-oxime semicarbazone is an effective fungicide. The structure of the chemical may be represented as follows:

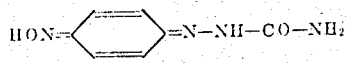

The compound and a method of preparation are described by Thiele and Barlow, Annalen der Chemie, 302, p. 331 (1898). It is there called "benzoquinone-1,4-oxime-semicarbazone."

The compound may be used as a seed protectant, and to protect plants, which term includes plant parts, or soil from microorganisms harmful to seeds and plants. It may also be applied to prevent or retard fungus growth and the formation of, for example, mildew on organic material such as rope, wood, fur, hair, feathers, cotton, wool, leather, paints, varnishes and the like. It may be applied as a dust, undiluted or mixed with a powered solid carrier, such as clay or talc, or as a liquid or a spray in a liquid carrier, as in solution in a suitable solvent, or suspended in a suitable non-solvent, for example, water. Preferably when applied from suspension in a liquid carrier, the composition contains a dispersing agent for the chemical. It may be applied as to foliage by the aerosol method. Solutions for the aerosol treatment may be prepared by dissolving the chemical directly in the highly volatile liquid carrier or first dissolving the chemical in a less volatile solvent and then admixing such solution with the highly volatile liquid aerosol carrier. The compound may be used admixed with carriers that are active of themselves, for example, other fungicides, or bactericides, insecticides, insectifuges, fertilizers, hormones, buffering or softening agents.

The following example is given to illustrate the invention:

Pea seed (variety Perfection) were tumbled with 1% by weight of benzoquinone mono-oxime semicarbazone in dust form. The seeds were then planted in greenhouse soil known to be infested with a number of organisms including *Pythium ultimum*. An equivalent number of untreated seeds were planted under similar conditions. Observations made at the end of ten days showed that 79% of the treated seed had germinated, whereas only 12% of the untreated seed had germinated.

Having thus described my invention, what I claim and desire to protect by Letters Patent is:

1. A fungicidal composition comprising as an active ingredient benzoquinone mono-oxime semicarbazone, and a carrier therefor selected from the group consisting of clay and talc, and water containing a dispersing agent.

2. A fungicidal composition comprising a powdered solid carrier and as an active ingredient benzoquinone mono-oxime semicarbazone.

3. A fungicidal composition comprising an aqueous suspension of benzoquinone mono-oxime semicarbazone, said aqueous suspension containing a dispersing agent.

4. The method of protecting organic material susceptible to attack by microorganisms which comprises treating said organic material with benzoquinone mono-oxime semicarbazone.

5. The method of controlling fungi on plants which comprises treating plants with benzoquinone mono-oxime semicarbazone.

6. The method of protecting seeds, plants and soil subject to attack or infestation by fungi which comprises treating said material with benzoquinone mono-oxime semicarbazone.

7. The method of immunizing seed which comprises treating said seed with benzoquinone mono-oxime semicarbazone.

8. The method of controlling fungi on living organisms which comprises treating said organisms with benzoquinone mono-oxime semicarbazone.

9. The method of destroying fungus which comprises subjecting said fungus to the action of benzoquinone mono-oxime semicarbazone.

10. The method of controlling mildew on organic material susceptible to attack by mildew which comprises treating said organic material with benzoquinone mono-oxime semicarbazone.

ELBERT C. LADD.

REFERENCES CITED

The following references are of record in the file of this patent:

UNITED STATES PATENTS

| Number | Name | Date |
| --- | --- | --- |
| 2,272,047 | Freeman | Feb. 3, 1942 |
| 2,349,771 | ter Horst | May 23, 1944 |
| 2,374,479 | Gerthr, et al. | Apr. 24, 1945 |

OTHER REFERENCES

Beilstein, volume 7 (1925 edition, page 630).